United States Patent [19]

Shim

[11] Patent Number: 5,119,909
[45] Date of Patent: Jun. 9, 1992

[54] BRAKE SHOE CONSTRUCTION HAVING EARS INTERFINGERED WITH THE PAD

[76] Inventor: Sanghyuk Shim, 3288 Reservoir Oval E., Apt. 510, Bronx, N.Y. 10467

[21] Appl. No.: 470,114

[22] Filed: Jan. 25, 1990

[51] Int. Cl.⁵ .................. F16D 65/08; F16D 69/04
[52] U.S. Cl. .................. 188/245; 188/250 B; 188/250 G
[58] Field of Search ............ 188/250 F, 252, 253, 188/250 G, 250 B, 242, 245, 247, 248, 258, 261, 234, 18 R, 73.1; 192/107 T, 76

[56] References Cited

U.S. PATENT DOCUMENTS

| | | | |
|---|---|---|---|
| 1,296,843 | 3/1919 | Olson | 188/250 G |
| 1,470,477 | 10/1923 | Pettis | 188/258 |
| 1,561,704 | 11/1925 | Down | 188/250 G |
| 1,659,061 | 2/1928 | Thompson | 188/242 |
| 1,757,273 | 5/1930 | Thompson | 188/250 G |
| 1,934,448 | 11/1933 | Roth | 188/250 G X |
| 2,016,280 | 10/1935 | Gatke | 188/250 G X |
| 2,040,551 | 5/1936 | Green | 188/250 G X |
| 2,254,950 | 9/1941 | Moore | 188/252 X |
| 2,291,525 | 7/1942 | Bessey | 188/242 |
| 2,402,101 | 6/1946 | Trainer | 188/258 |
| 3,186,516 | 6/1965 | Stump | 188/18 R |
| 3,467,229 | 9/1969 | Deibel | 188/245 |

*Primary Examiner*—Robert J. Oberleitner
*Attorney, Agent, or Firm*—J. Bradley Cohn

[57] ABSTRACT

A brake shoe and friction pad that permits removal and replacement of the pad without removing the brake drum or the shoe from its position within the drum by employing spaced upstanding lugs on one end of the shoe and spaced openings on the other edge. The pad has complementary lateral ears on one edge to engage between spaced lugs and complementary bottom projections adjacent its other edge to engage the spaced openings. Further circumferential support is provided by bolts secured inside each flange near the ends of the pad in a manner that permits removal without separating shoe from drum.

4 Claims, 4 Drawing Sheets

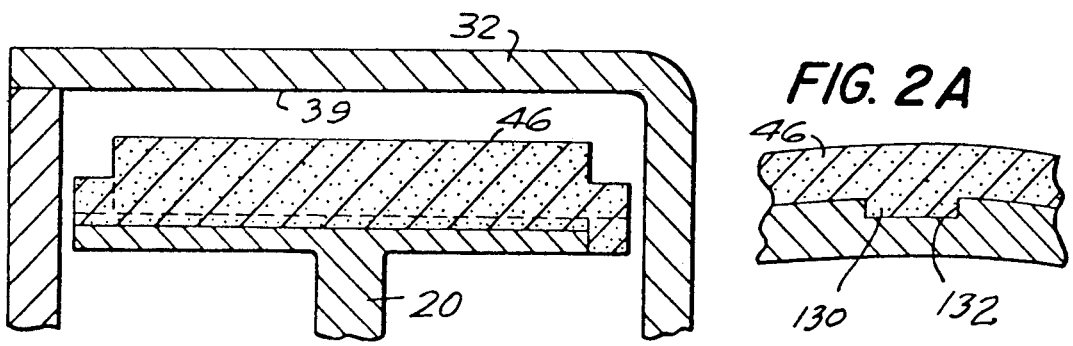
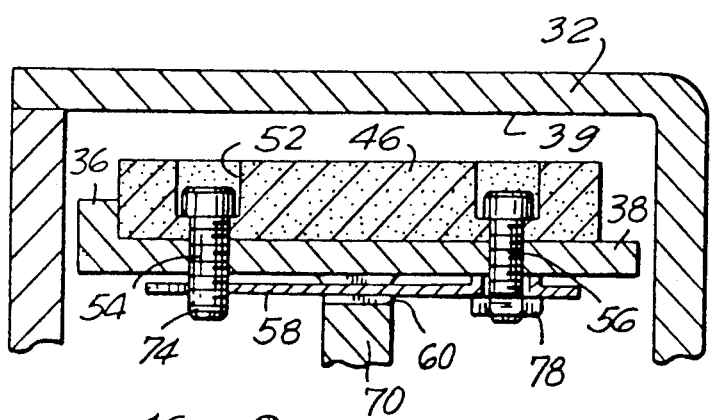
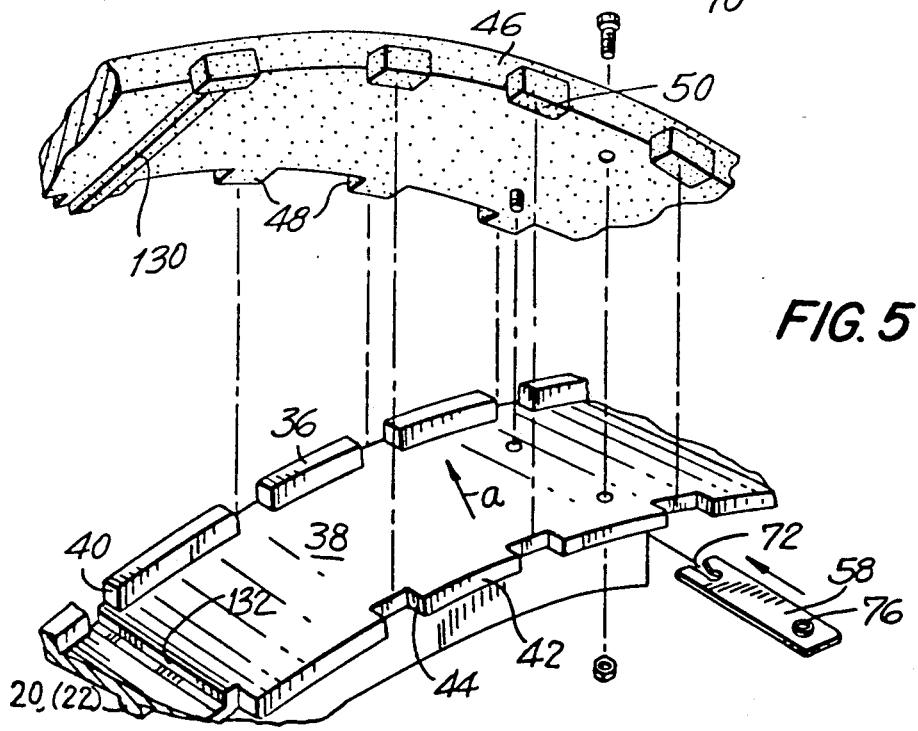

1

BRAKE SHOE CONSTRUCTION HAVING EARS INTERFINGERED WITH THE PAD

BACKGROUND OF THE INVENTION

The present invention relates to brake shoes, generally brake shoes of the type constructed to extend into a drum. More particularly, it relates to a friction pad and quick-change means for securing the friction pad to the shoe.

It is an object of the invention to provide a shoe and a friction pad that can be readily secured to the shoe without removing the shoe from its position within the drum.

It is a further object to obviate the necessity of replacing the more expensive shoe as a brake pad wears out and to provide that only the brake pad be replaced. Normally in replacing brake shoes it is necessary to remove the wheel and the drum and then the brake shoe which is held in place by tension springs and the like.

PRIOR ART

The prior art show means for securing a replaceable pad of a brake shoe as shown in Heany U.S. Pat. No. 1,616,659. None of this prior art, however, teaches or suggests how the friction pad may be placed on the shoe while the shoe is still within the confines of the brake drum. Gallagher U.S. Pat. No. 787,092 shows inverted dovetails 8 and 9 but requires the overlying structure 11.

SUMMARY OF THE INVENTION

The present invention relates to an improvement structure and method for applying the pad to a brake shoe so that it may be readily removed and replaced without the need of removing the brake pad and the shoe. The structure involves a combination of a raised edge on the brake shoe with complementary mating lugs.

BACKGROUND OF THE INVENTION

The brake shoes employed on vehicles for braking generally have the pad permanently secured to the shoe so that when the friction pad is worn out the entire shoe and pad must be replaced. This is not only wasteful of material but involves substantial labor in dismounting the shoes and mounting its replacement.

Heany U.S. Pat. No. 1,616,659 and Gallagher U.S. Pat. No. 787,092 sought to overcome this problem by producing complementary mating ridges to secure the pad to the shoe. Further securing means required in both Gallagher and Heany are difficult to apply and unsatisfactory.

It is therefore an object of my invention to provide novel mating structure between the brake and brake pad and further novel securing means that while strong and durable may be simply and quickly applied.

It is an object of the invention to provide a quick and secure means for removing and replacing the brake pad without dismounting or removing the brake shoe from the vehicle.

A still further object of the invention is to design a structure where the brake pad may be replaced without removing the brake drum for use in very heavy equipment.

BRIEF DESCRIPTION OF THE DRAWINGS

FIG. 2A is taken on the line 2A—2A of FIG. 2;
FIG. 3 is taken on the line 3—3 of FIG. 2;
FIG. 4 is taken on the line 4—4 of FIG. 2;
FIG. 5 is an exploded partial view of a preferred embodiment of the invention.

Figure 1:
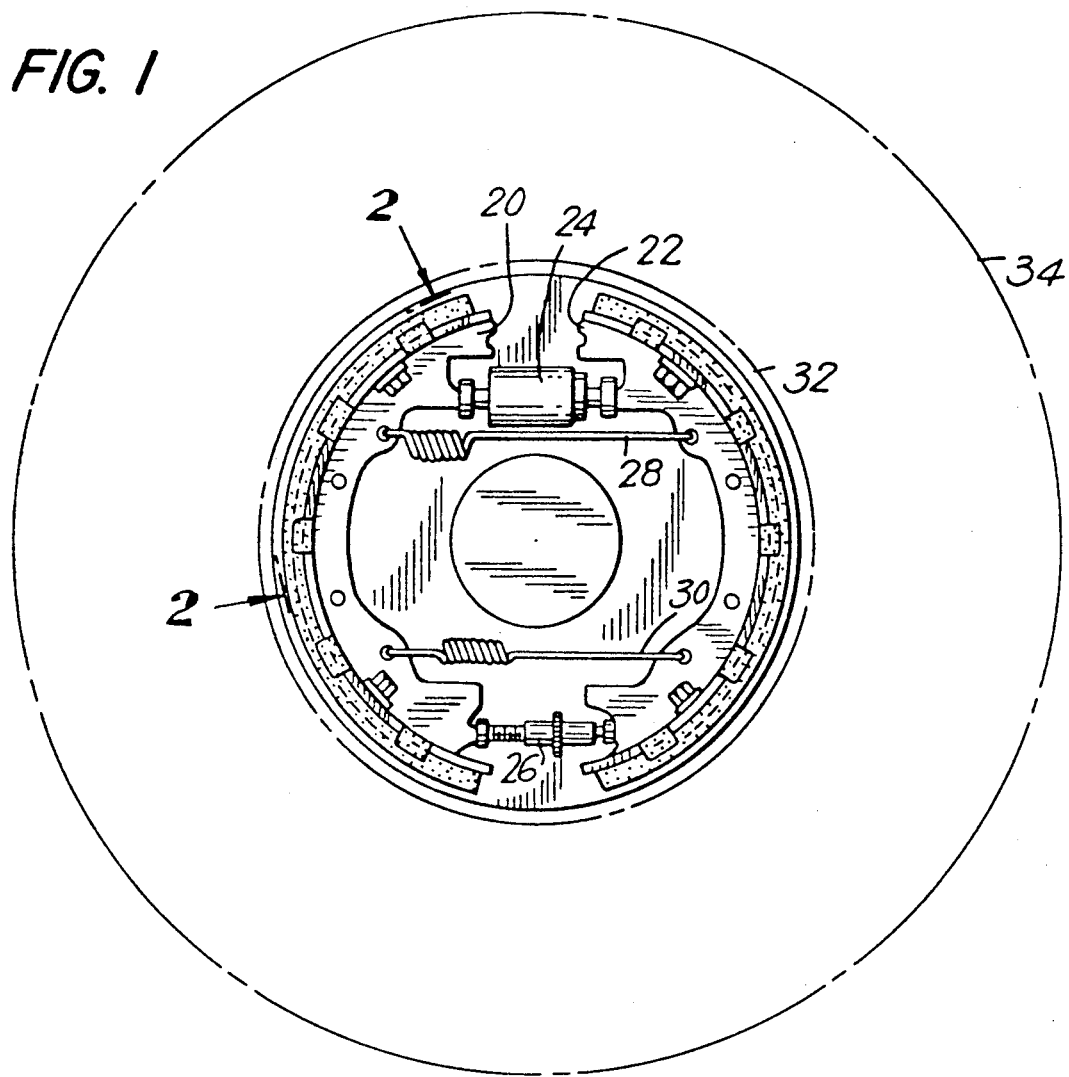
FIG. 1 is a side elevation showing the improved brake shoe pad and brake drum.
Figure 2:
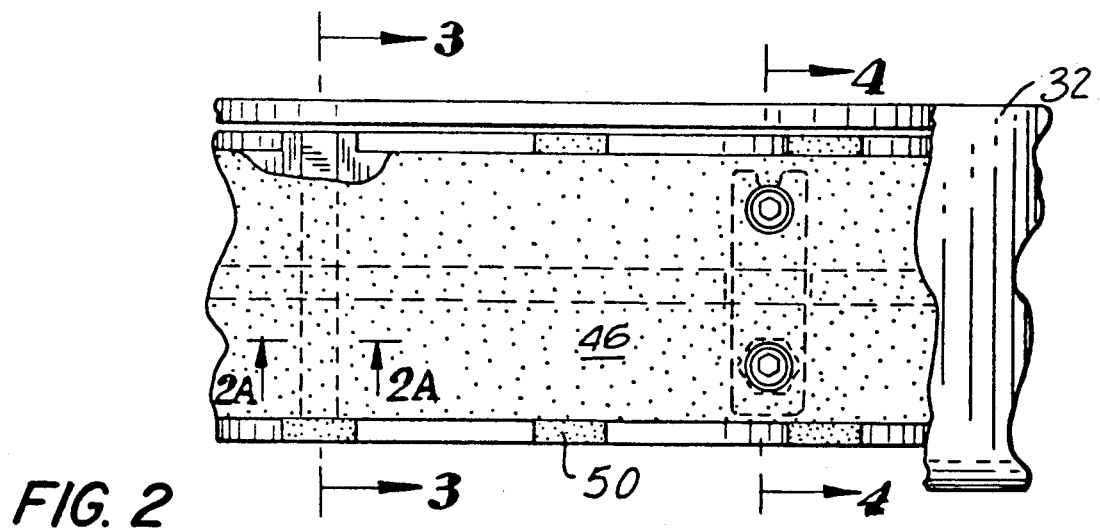
FIG. 2 is taken on the line 2—2 of FIG. 1.

Referring now more specifically to the embodiments illustrated in FIGS. 1—5, brake shoes 20 and 22 are shown with a brake actuator 24 and brake adjuster 26 and the return spring 28 and pull-back spring 30. Brake drum 32 is shown in broken lines as is the circumference 34 of the wheel. The lateral edge 36 of the flange 38 of brake shoe 20 (22) is bent outwardly radially 90 degrees and is further formed discontinuously to leave the openings 40. The opposite edge 42 remains in the same circumferential plane as the flange 38 but is formed with the openings 44. The brake pad 46 has integral ears 48 which are received matingly in the openings 40. Pad 46 further has lugs 50 formed and attached to its opposite edge to be matingly received in the solts 44. Countersunk in bores 52 are inner securing bolts of screws 54 and outer securing bolts or screws 56. A securing clip 58 passes through a slot 60 in web 70 of brake shoe 20 (22). Clip 58 has formed in it a keyhole notch 72 which threadingly receives the threads 74 of inner screw 54. The outer end has the clip 58 of threaded bore 76 to receive the outer screw 56. The bore 76 may be extended for greater security by a nut 78. The ears 48 in opening 40 and ears 50 in openings 44 retain pad 46 against circumferential movement of the pad with respect to the flange 38 of the shoe 20 (22). Axial movement in the direction of the arrow a is restrained by the upper edge 36 and ears 50 in openings 44. Screws 54,56 secure the ends of the pad against any movement with respect to flange 38.

Figure 10:
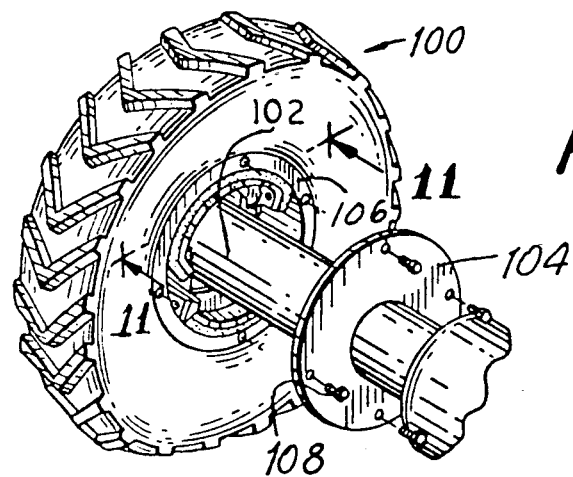
FIG. 10 is anisometric of still another embodiment of the invention employed with very heavy equipement.
Figure 11:
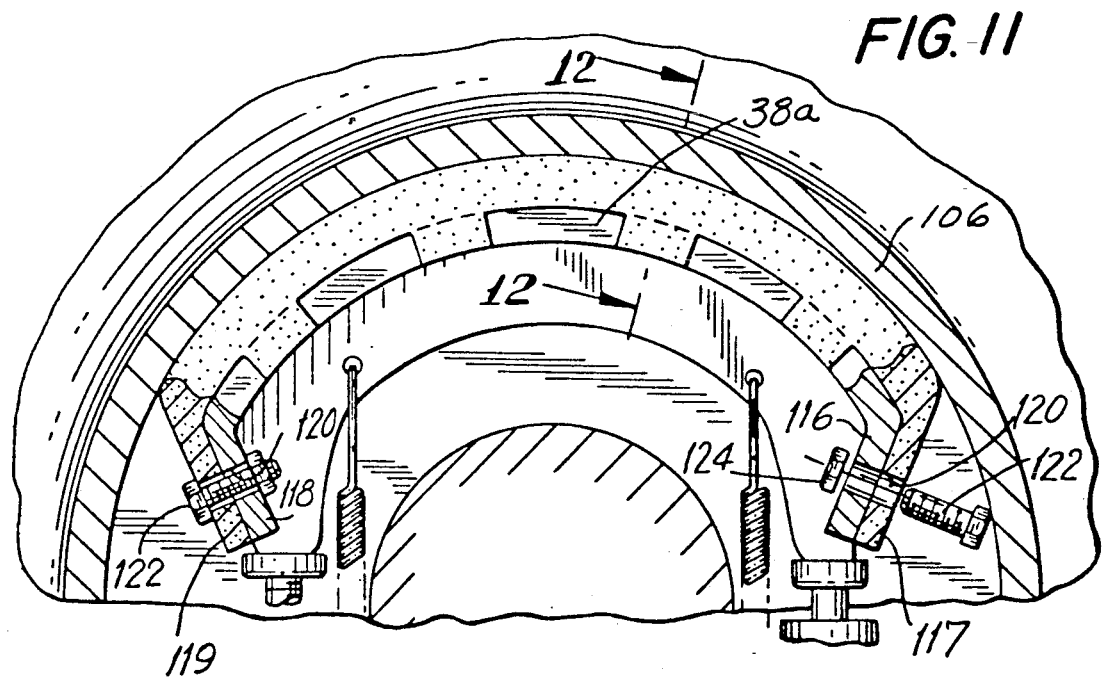
FIG. 11 is an enlarged showing of the embodiment shown in FIG. 10 and taken on the line 11—11 of FIG. 10.
Figure 12:
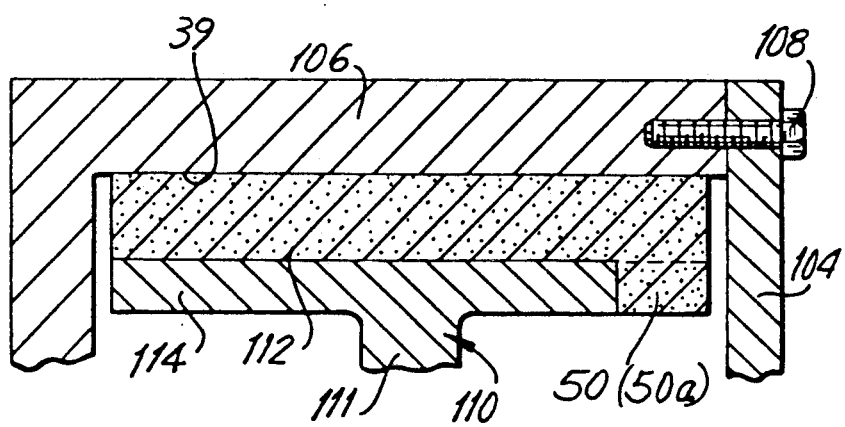
FIG. 12 is taken on the line 12—12 of FIG. 11.

It should be here noted that in adapting this embodiment to the heavy form embodiment of FIGS. 10, 11 and 12, the length of the screws 54 and 56 should be no greater than the distance of the outer surface of the flange 38 to the inner face or surface 39 of the drum 32. It should also be noted that in many applications where the brake drum is going to be removed from around the axle (not shown) both edges of the brake shoe flanges may be upturned as shown for the one edge at 36.

Figure 6:
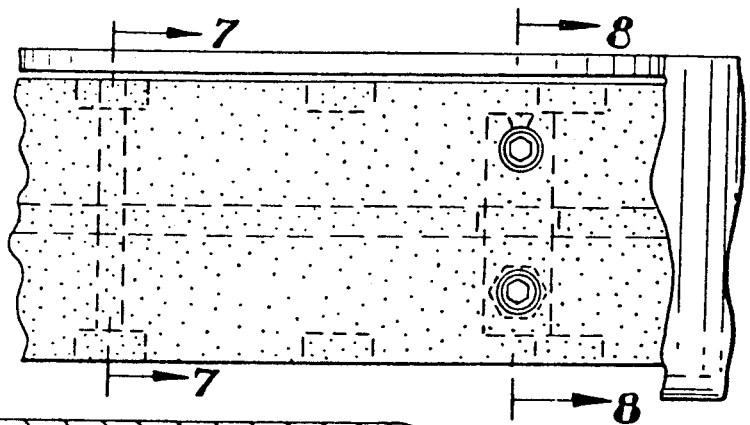
FIG. 6 is a planar circumferential view of another embodiment of my invention with the brake drum partially cutaway.
Figure 7:
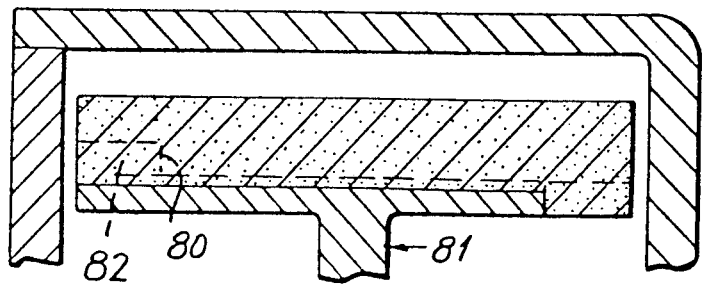
FIG. 7 is taken on the line 7—7 of FIG. 6.
Figure 8:
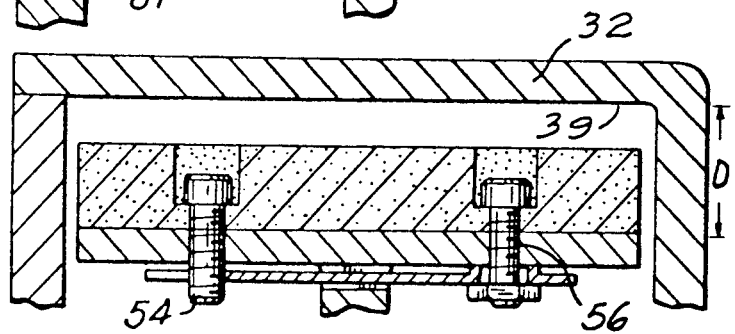
FIG 8 is taken on the line 8—8 of FIG. 6.
Figure 9:
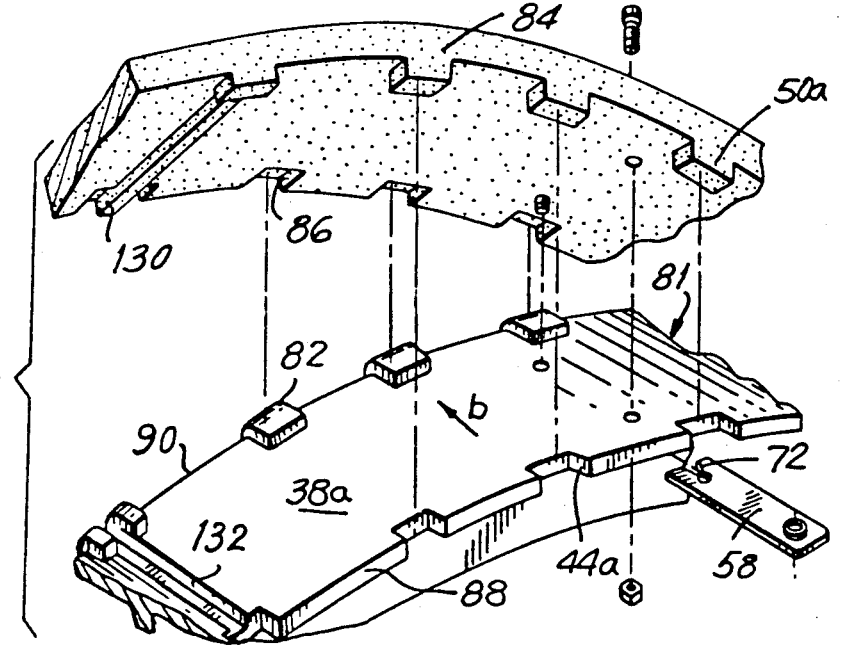
FIG. 9 is an exploded view of the embodiment of the invention illustrated in FIG. 6.

Referring now more specifically to the embodiment illustrated in FIGS. 6, 8 and 9, the inner edge of the flange 80 of shoe 81 may be segmented and bent-over 180 degrees to form the lug 82 in which case the brake pad 84 has formed in it the recesses 86 which matingly receive the legs 82. As shown in FIG. 9, the pad 84 has lugs 50a corresponding to the lugs 50 in pad 46 which matingly are engaged in slots 44a corresponding to the slots 44 of the embodiment shown in FIG. 5. The clip 58 receiving in keyhole notch 72, thread 76 and screws 54 and 56 remains unchanged.

It should here be understood that the outer edge 88 of flange 38a may be identical to the inner edge 90 with the lugs 82. This is particularly so where the pad will be replaced after removal of the brake drum.

Here again the edge 90 will restrain against axial movement in the direction of the arrow b. If edge 88 is formed as a mirror image of edge 90, it will restrain movement in the axial direction contrary to arrow b. The mating lugs 82 (58a) with slots, openings or recesses 44a (86) restrain against movement in the circumferential direction.

A further embodiment of my invention illustrated in FIGS. 10, 11 and 12 is particularly useful with heavy duty vehicles. FIG. 10 shows the wheel and tire 100 mounted about the axle housing 102 having a duster cover plate 104 secured to the inner edge of the brake drum 106 by the threaded studs 108. Cover plate 104 is axially slidable and releasably mounted about axle housing 102. The brake shoe 110 carries as pad 112 which may be constructed in accordance with the embodiment shown in FIG. 5 or in FIG. 9. FIG. 12 illustrates a lug such as 50 or 50a in a position on the flange 114 of shoe 110. The inner edge securing means is not illustrated in FIG. 12 but it may be either of the embodiments shown in the inner edge of the flanges in FIGS. 5 and 9.

Referring more specifically to FIG. 11, there is shown an alternative means for securing the ends of the pad to the brake shoe. The circumferential flange segment of the brake shoe has its teminal ends 116, 118 bent inwardly. The brake pad 112 has corresponding inwardly bent ends 117 and 119. Bores 120 are formed in each end to receive screws 122 retained by nut 124. If it is desired to have two axial displaced screws 122 at each end they may be secured by the clip and slot arrangement illustrated in FIGS. 4 and 5. This will, or course, require a slot such as slot 60 (FIG. 4) formed in the web 111 of the shoe 110.

An optional but useful addition to the structures heretofore described is shown in FIGS. 2, 2A, 3, 5, 6, 7 and 9. A raised ridge 130 may be formed on the pad 46 (84) with a complementary groove 132 formed in the flange 38 (38A) of the shoe 20, (22,81). The ridge 130 is positioned substantially at the circumferential center of the brake pad 46, 84. Likewise the groove 132 is formed across the midpoint of the flange 38,38A. Ridge 130 nests matingly in groove 132 to provide increased circumferential stability.

The optional ridge 130 in slot 132 further restrains movement in the axial direction. The ridge 130 may be employed in either embodiment as may readily be understood even though not shown in the FIGS. 10, 11 AND 12 embodiment.

It may be seen that the several embodiments illustrated may be, according to the circumstances, varied each by the other without departing from the purview set forth in the following claims.

I claim:

1. In combination, a brake drum having a closed end and an open end, a brake shoe having an outwardly facing flange mounted within said brake drum, said flange having an inner edge and an outer edge, said inner edge being bent upwardly to form an upstanding ridge, openings formed in said ridge so said ridge is substantially discontinuous, said outer edge of said shoe having openings formed therein, a brake pad, having an inwardly facing side and an outwardly facing side, matingly securable to said outwardly facing flange, said pad having an inward first edge and an outward second edge, ears formed on its first edge to matingly interfinger with said openings in said ridge along said inner edge of said flange, said pad having radial inwardly extending lugs formed on its bottom side adjacent its second edge to matingly engage said openings in said outer edge of said shoe, and at least one bolt piercing said pad and said flange, said bolt having a length no greater than the radial distance between said flange and said drum, and said bolt is releasably securable to said flange.

2. The combination setforth in claim 1 further characterized in that said bolt is counter-sunk in said pad.

3. The combination set forth in claim 1 and further characterized by a cover plate mounted to the open end of said drum.

4. The combination setforth in claim 2 and further characterized by a cover plate mounted to the open end of said drum.

* * * * *